May 26, 1959  F. G. BLAKE ET AL  2,888,663
APPARATUS FOR COMBINING SEISMIC SIGNALS
Filed March 14, 1955
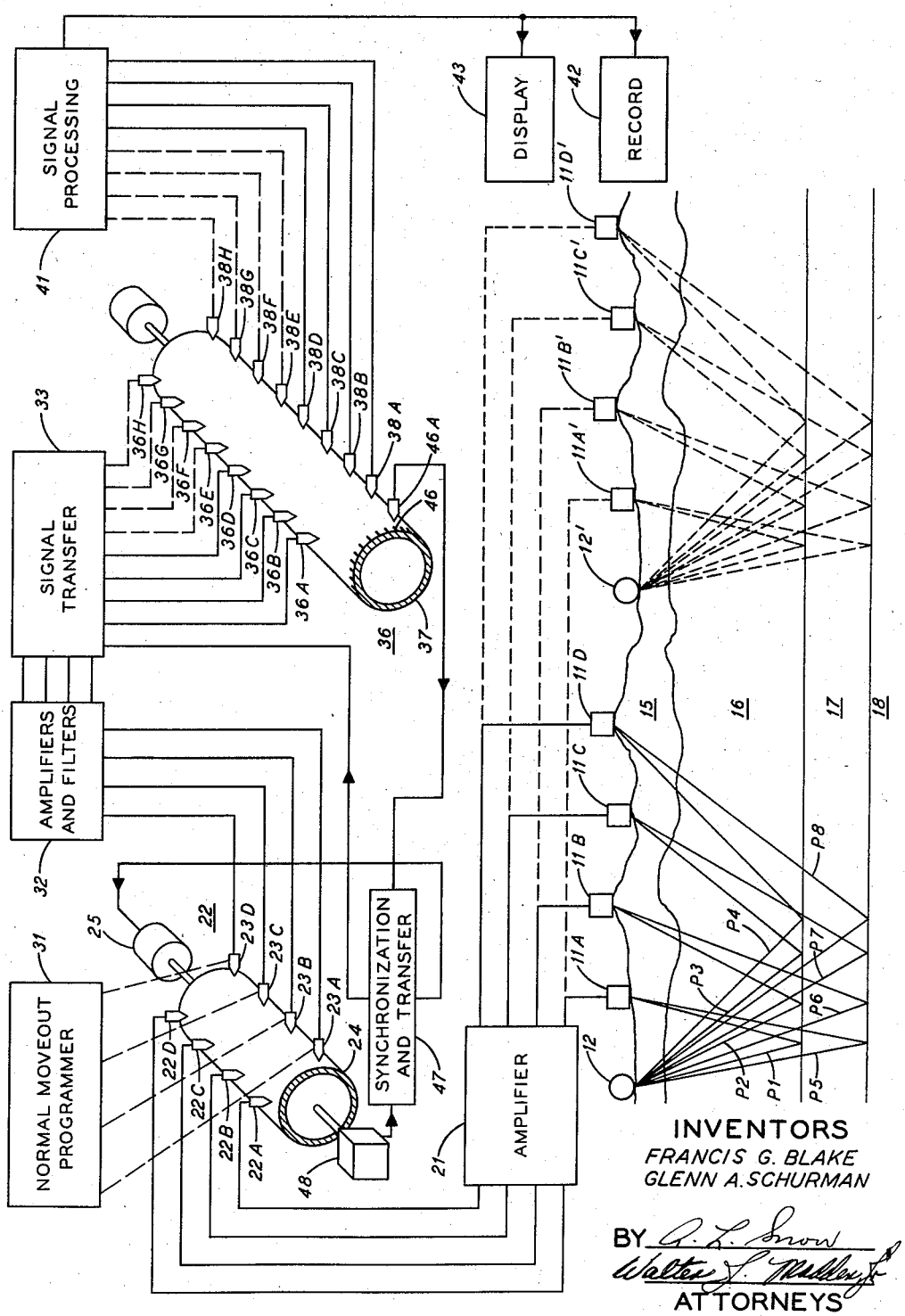
INVENTORS
FRANCIS G. BLAKE
GLENN A. SCHURMAN
ATTORNEYS United States Patent Office 2,888,663
Patented May 26, 1959

2,888,663

APPARATUS FOR COMBINING SEISMIC SIGNALS

Francis G. Blake, Fullerton, and Glenn A. Schurman, Whittier, Calif., assignors to California Research Corporation, San Francisco, Calif., a corporation of Delaware Application March 14, 1955, Serial No. 493,967

2 Claims. (Cl. 340—15)

This invention relates in general to seismic prospecting and relates more particularly to methods and apparatus for recording and analyzing seismic detector signals obtained in such prospecting.

In the art of seismic prospecting, seismic waves artificially generated in the earth are utilized to actuate a plurality of seismic detectors which are responsive to reflections and refractions of the waves from subsurface strata to produce electrical output signals varying in sympathy with the waves. The seismic detector signals may then be reproducibly recorded and subsequently reproduced repeatedly and at will, usually in the laboratory, for further analysis. Reproducibly recording the signals permits a number of different operations to be performed on the signals to improve the signal-to-noise ratio or otherwise increase the information obtainable from the signals.

One of such operations utilized to aid in obtaining information from the recorded seismic data is the use of different filter settings on different playbacks of the records, the original seismic detector signals having been recorded with substantially all of the original frequency components retained. Then, in subsequent playback and analysis, the original broadband record is analyzed on the basis of a variety of different filter settings to determine the optimum filtering conditions.

Another operation sometimes utilized to increase the signal-to-noise ratio of the seismic detector signals is mixing or combining different detector signals to produce a composite signal in which the reflections or other events of interest are more prominent than in the unmixed signals. In one such method of mixing, signals produced by different seismic detectors during a given seismic disturbance are mixed to produce a composite signal in which noise present in each of the individual signals should, to some extent, tend to randomize, with a consequent increase in the relative magnitude of the reflections.

The mixing of more than one seismic record is often useful in bringing out deep reflections which, in a single record, are obscured by reverberation, by energy scattered from shallow inhomogeneities or by high-frequency surface waves, and a number of different types of interrecord mixing may be utilized to improve the information obtainable from the seismic prospecting. In one of such methods, two separate seismic disturbances are produced utilizing the same relative positions of shot point and detectors during both disturbances. Each of the resulting seismic detector signals from the first disturbance is then mixed or combined with the signal from the corresponding detector in the second disturbance to produce a group of composite signals. In another form of interrecord mixing, a first seismic disturbance is created at some selected depth in a shot hole, and the earth movement resulting therefrom is detected at a plurality of detectors to produce a first group of detector signals. A second disturbance is then created at a different depth in the same shot hole, and each of the detector signals resulting from this disturbance is mixed with a signal from the corresponding detector in the first disturbance to produce a group of composite signals or traces.

In accordance with one feature of this invention, a novel form of interrecord mixing is utilized which is particularly advantageous in increasing the signal-to-noise ratio of the mixed signals. In this method, one of the seismic disturbances is of considerably less magnitude than the other, and the resulting groups of signals are subtracted from each other. The theory behind this method is that, for seismic disturbances of relatively small magnitude, the non-linear transmission characteristics of the earth will cause the seismic detector signals produced by the smaller disturbance to have a lower signal-to-noise ratio than the detector signals produced by a larger disturbance. Thus, when the two groups of detector signals are combined, subtraction of one group of signals from the other will increase the signal-to-noise ratio of the resulting composite signals, since such subtraction effects a larger net decrease in noise amplitude than in signal amplitude, owing to the above non-linear characteristics of the earth.

In all of the above-described mixing operations, it is essential that time variations between the arrivals of reflected energy from a given reflecting horizon at the different seismic detectors be compensated for prior to mixing so that corresponding reflections in the different signals will be in the proper phase relationships to produce maximum reinforcement of the reflections in the composite signal. The intersignal or intertrace time variations in a seismic record may be divided into two categories—those which have a substantially constant value for the duration of a given seismic disturbance, and those whose magnitude is variable throughout the duration of the seismic disturbance. Among the causes of the substantially constant time variations are differences in the thickness of the weathered layer under the different detectors and dipping or tilting of the reflecting horizon. The most important cause of the variable time delays is the fact that the different detectors are spaced different distances from the shot point or other source of seismic energy so that energy reflected from a given subsurface interface consequently arrives at the detector nearest the shot point before it arrives at detectors farther from the shot point. This latter time variation, commonly referred to as normal moveout time, has its maximum values for reflections from relatively shallow reflecting horizons, since the differences in the distances from the reflecting horizon to the different detectors is larger for these shallow reflections than for deeper reflections. Thus, the normal moveout time decreases in value during the seismic disturbance and becomes substantially zero when the differences in the distances from the reflecting horizon to the different detectors becomes negligible.

Because the original recording device is a field unit, its recording capacity is usually limited, so that, to perform mixing of a large number of seismic signals, a recording device is required that has sufficient capacity for storing and, if necessary, simultaneously reproducing all of the signals to be mixed. In accordance with one feature of this invention, where groups of signals resulting from more than one seismic disturbance are to be combined, the mixing may be performed by simultaneously reproducing the different signals and performing the mixing operations. For such simultaneous reproduction, the different groups of seismic signals may be reproduced from a battery of synchronized reproducers or, alternatively, each group of the seismic signals may be transferred to an intermediate storage device having a recording capacity sufficient to simultaneously store and reproduce all the different signals. An intermediate storage device is a reproducible recorder in which the recording medium is not normally removable and in which the recording and/or reproducing heads are movable as a unit. The use of such an intermediate storage device is preferable to the use of a battery of synchronized reproducers for several reasons. One reason for such preference is that the use of an intermediate storage device permits ganged movement of the recording and/or reproducing heads for normal movement and fixed time compensation, whereas most current field recorders and reproducers are provided with heads which are movable only one at a time. Although these field recorders and reproducers could be provided with heads which are movable as a unit, such a change is not particularly desirable, owing to the attendant increased complexity and size of the equipment which would have to be carried into the field. An additional advantage of the use of an intermediate storage device is that it permits all of the field records to be reduced to the same common time scale and thus facilitates interrecord mixing and other signal processing operations, whereas the use of separate, synchronized reproducers introduces the possibility of time scale errors resulting from stretching of the different recording media and other causes.

Thus, in a representative operation in accordance with this invention, assuming that the field recorder has the capacity for recording only one group of signals at a time, each group of seismic detector signals from a given seismic disturbance is first reproducibly recorded on the field recorder, and the recording medium containing this group is removed and replaced or, if the field recorder is located adjacent the intermediate storage device, the recorded information is reproduced from the field recorder and transferred to the intermediate storage device, thus making the field recorder available for recording the next group of detector signals from the subsequent seismic disturbance. This next group of signals is similarly reproducibly recorded on the field recorder and this procedure repeated until the desired number of groups of signals has been obtained. When a removable recording medium is utilized on the field recorder and this medium removed and replaced after recording each group of signals, the signals on the individual recording media may then be subsequently reproduced, usually in the office or laboratory, and recorded on the intermediate storage device. In transferring each group of seismic detector signals to the intermediate storage device, it is essential that they be accurately positioned with respect to the other groups of signals thereon in order to insure the correct phase relationships among the signals for mixing.

Broadly, the present invention contemplates methods and apparatus for seismic prospecting in which a plurality of seismic detector signals are sequentially recorded on a rotatable, reproducible recording medium, and each group so recorded is reproduced and transferred to a rotatable intermediate storage device which is synchronized with the first reproducible recording medium so that each group of signals from the reproducible recording medium is accurately placed on the intermediate storage device relative to the other groups. The signals are then reproduced from the intermediate storage device with appropriate time variations between the different signals, and corresponding signals from each group are combined to produce a plurality of composite signals which are then recorded and/or oscilloscopically displayed.

More specifically, an accurate timing reference is incorporated in the intermediate storage device, and this timing reference is compared with a timing signal from the reproducible recording medium to produce a control signal which is utilized both to correct the speed of the reproducible recording medium to the desired value relative to the speed of the intermediate storage device and to initiate the transfer of the groups of signals from the reproducible recording medium to the intermediate storage device when the two elements have the proper speed and phase relationships. An additional feature of the present invention is a method of interrecord mixing in which separate seismic disturbances of different magnitudes are produced and the resulting detector signals are combined to produce cancellation of a great deal of the noise or extraneous energy in the signal.

It is therefore an object of this invention to provide improved methods and apparatus for seismographic surveying.

It is an additional object of the present invention to provide methods and apparatus for combining groups of seismic detector signals in which each group of signals is recorded on a first rotatable, reproducible recording medium and then transferred to a second rotatable, reproducible recording medium whose rotation is synchronized with that of the first medium to produce accurate alignment of corresponding portions of the different groups of signals on the second medium.

It is a further object of this invention to provide methods and apparatus for combining groups of seismic detector signals in which each of such groups is recorded on a first rotatable, reproducible recording medium whose speed of rotation is compared with that of a second rotatable, reproducible recording medium and the group of signals is transferred to the second medium when the speeds and phases of the two media have a predetermined relationship.

It is an additional object of the present invention to provide methods and apparatus for controlling a pair of rotatable, reproducible recording media to produce a predetermined relationship between the rotation thereof and to transfer information between the media only when this predetermined relationship obtains.

It is a further object of this invention to provide improved methods and apparatus for seismic prospecting in which groups of seismic detector signals produced in response to separate seismic disturbances at different depths in a given shot hole are combined to produce a plurality of composite seismic signals having an increased signal-to-noise ratio.

It is an additional object of the present invention to provide methods and apparatus for seismic prospecting in which separate seismic disturbances of different magnitude are produced at a given location and the seismic detector signals resulting from these disturbances are combined to produce increased signal-to-noise ratios in the resultant signals.

Objects and advantages other than those outlined above will be apparent from the following description when read in conjunction with the accompanying drawing, the single figure of which diagrammatically illustrates one embodiment of the present invention, together with a cross-section of representative terrain to be surveyed.

The single figure shows a cross-section of representative terrain to be explored by the method of this invention. A plurality of seismic detectors 11A, 11B, 11C and 11D are shown at spaced-apart points on the surface of the earth for detecting seismic waves generated by a source of seismic energy generally designated 12. As is well known in the art, source 12 may be an explosive material or an elevated weight which is dropped or any other suitable source of seismic energy. Source 12 produces waves which travel through the earth and are reflected from various subsurface interfaces back to the surface of the earth, where the earth movement is detected and converted into corresponding electrical signals by detectors 11A, 11B, 11C and 11D. Although, for simplicity, only four detectors are shown in the drawing, it will be understood by those skilled in the art that any suitable number of such detectors may be utilized and that the detectors may be arranged in any suitable known configuration.

The portion of the terrain shown in the drawing is composed of a weathered layer 15, upon which the detectors are located, and subsequent strata 16, 17 and 18. Ideally, the energy radiated by source 12 and reflected by the interface between strata 16 and 17 travels by paths $P_1$, $P_2$, $P_3$ and $P_4$, respectively, to the detectors 11A, 11B, 11C and 11D. Similarly, the energy reflected back to the detectors from the interface between strata 17 and 18 travels by paths $P_5$, $P_6$, $P_7$ and $P_8$ to the different detectors. It will be seen from the cross-sectional view of the terrain that the thickness of the weathered layer 15 through which the different reflections travel is different for each of the detectors 11A, 11B, 11C and 11D. It is therefore necessary to correct for the effects of these different thicknesses of weathered layer on the travel times of the reflected energy to provide the proper phase relationships among the different signals for mixing. Substantially fixed time delays may also be caused by differences in the elevations of the different detectors, or by dipping or tilted reflecting horizons, and these time delays, where present, will also require correction.

In making the weathering corrections it is possible to assume that they are the same for all directions of arrival of the waves, since the velocity of wave propagation through the weathered layer is very much lower than through the consolidated strata beneath it. As a result, the waves passing from the underlying stratum into the weathered layer are bent toward the vertical, and since the difference in velocity between the weathered layer and the underlying stratum is substantial, the error involved in assuming that the waves do travel vertically through the weathered layer is negligible. Therefore, the time delay component necessitated by the weathering correction may be considered to be substantially constant for any given detector throughout the duration of the seismic disturbance.

An additional factor producing differences in the times of arrival of a given reflection at the different detectors is that the several detectors are different distances from the source 12. Thus, the reflection from the interface between strata 16 and 17, traveling path $P_1$, will reach detector 11A before the energy reflected from this same interface and traveling along path $P_2$ arrives at detector 11B. The arrivals of the energy reflected from this interface will also be correspondingly delayed in arriving at detector 11C and at detector 11D. Similarly, the energy reflected from the interface between strata 17 and 18 will arrive at detector 11A before the energy reflected from this interface arrives at detector 11B, and will arrive at detectors 11C and 11D at correspondingly later times. However, the time delay or normal moveout time for the interface between strata 17 and 18 is not as large as the normal moveout time for the reflections from the interface between 16 and 17, since the differences in the distances traveled by the energy to the several detectors are smaller for reflections from the interface between strata 17 and 18 than such differences are for reflections from the interface between strata 16 and 17.

Thus, the normal moveout time is a function having its maximum value for reflections from shallow reflecting horizons and decreasing in value for subsequent reflections from deeper horizons, finally decreasing to substantially zero when the differences in the distances traveled by the different reflections from a given reflecting horizon to the several detectors are negligible. The exact shape of the moveout function as a function of the time after the initiation of the seismic disturbance will, of course, depend upon the particular velocity functions involved in the terrain being explored and the particular spacings of the detectors, but, in general, the moveout function appears to decrease somewhat exponentially as a function of the time elapsing after the shot.

From the above discussion, it will be apparent that the energy reaching the different detectors may be considered to have a time delay component which is substantially fixed throughout the duration of the seismic disturbance, and a time delay component which is variable in magnitude throughout the duration of seismic disturbance. If the signals produced by detectors 11A, 11B, 11C and 11D are to be combined, it is essential that similar events or reflections in each of the different signals be in phase for such mixing in order to increase the magnitude of the reflection in the mixed signal relative to the surrounding noise. To accurately compensate for the different intertrace time variations, each of the signals should be varied in time relative to the others by an amount which has a substantially fixed component and a component which is variable during the duration of the signal.

To accomplish this, the different output signals from the detectors are supplied through an amplifying network 21 to a suitable reproducible recording device generally designated at 22. Recording device 22 may be of any suitable known type, but, preferably, it is a magnetic recording device having a layer of magnetizable material 24 mounted on a rotor driven by a motor 25. Recorder 22 is also provided with a plurality of recording heads 22A, 22B, 22C and 22D connected, respectively, to the several detectors 11A, 11B, 11C and 11D through amplifier 21. Device 22 may be also provided with a plurality of reproducing or playback heads 23A, 23B, 23C and 23D corresponding, respectively, to recording heads 22A, 22B, 22C and 22D, for reproducing the information recorded on the different channels of magnetizable medium, or layer 24. Although separate recording heads and reproducing heads for each channel have been shown in the drawing, it will be obvious to those skilled in the art that these two functions may be combined in a single head for each channel, and such variation is contemplated as being within the scope of this invention.

Each of heads 23A, 23B, 23C and 23D is movable about the periphery of layer 24 so as to vary the relative positions of each of these heads along the time axis of the recorded signals. The reproducing heads are mechanically connected, as shown by the dotted lines, to a device 31 for moving the reproducing heads according to a predetermined pattern or program during the reproducing operation, as will be discussed more in detail below. The signals from the reproducing heads are supplied through transfer means including an amplifying network 32, which may also contain a stage or stages of filtering, to a device 33 for transferring the reproduced signals to an intermediate storage device generally designated 36.

Device 36 is preferably provided with another rotatable, magnetic recording medium, such as a magnetizable layer 37 upon which a plurality of recording heads 36A, 36B, 36C and 36D records signals supplied thereto. The storage capacity of intermediate storage device 36 is preferably considerably in excess of the storage capacity of recorder 22 so that several groups of signals originally recorded on device 22 may be simultaneously stored on intermediate storage device 36. Intermediate storage device 36 is also provided with reproducing heads 38A, 38B, 38C and 38D for reproducing the associated signals recorded by the recording heads. As in the case of recording device 22, although separate recording heads and reproducing heads are shown for each channel of device 36, it will be understood that the double function may be combined into a single head for each channel, as is well known in the art. The reproducing heads of device 36 are movable about the periphery of layer 37 so as to enable the positions of the reproducing heads to be varied along the time axis of the signals recorded on the different channels. The signals from reproducing heads 38A, 38B, 38C and 38D are connected to a signal processing network 41 in which additional operations, such as mixing, signal level adjustment, and filtering may be performed on the reproduced signals. The output from signal processing means 41 is supplied to a recording device 42 and/or a display device 43 for producing a permanent record and/or an oscilloscopic display of the resultant composite signal or signals.

Device 36 is provided with means for accurately determining the speed and position of the information recorded on the magnetizable layer 37. Such means may be in the form of a timing signal or trace consisting of a series of notches or grooves 46 on one channel of device 36. Timing grooves 46 pass under a reproducing head 46A to supply a series of timing signal pulses to a network shown schematically at 47 for controlling the relative speeds of rotation of devices 22 and 36 and for controlling the transfer of groups of seismic detector signals from device 22 to intermediate storage device 36. One or more of notches 46 may be given a distinctive characteristic to provide an indication of the rotative position of recording medium 37. For example, the characteristic notch may be placed on medium 37 coincident with the beginning or zero point in the time axis of medium 37, so that an indication is provided when this point passes under head 46A. A device 48 driven in common with recording medium 24 by motor 25 is provided to produce a timing signal responsive to the speed and position of recording medium 24. This signal is supplied to network 47 where it is compared with the signal from head 46A to provide a control signal that is a measure of the differences in speed and phase between the two recording media.

The control signal from network 47 is supplied to a drive means, motor 25, for correcting the speed and phase of recording medium 24 to the desired value. When the two recording media are synchronized to the desired relative speed and phase relationships, network 47 supplies an impulse to actuate signal transfer means 33 to transfer the group of seismic detector signals from recording medium 24 to intermediate storage device 36.

The operation of the embodiment illustrated in the drawing is as follows. Upon actuation of source 12, energy is transmitted through the earth and reflected from the various reflecting horizons back to detectors 11A, 11B, 11C and 11D to produce a plurality of electrical signals varying in sympathy with the earth movement. As discussed above, reflections arriving at the different detectors from the different reflecting interfaces are subject to relative time delays, each of which may be considered to have a component which is of substantially constant magnitude throughout the duration of the seismic disturbance and a component having a magnitude variable during the duration of the seismic disturbances. The signals from the several detectors are amplified in amplifying network 21 and supplied to recording heads 22A, 22B, 22C and 22D for recording on the various channels of recording medium 24. The signals are preferably recorded with little or no filtering so that the original broadband signals are available on recording medium 24 for subsequent analysis.

In the embodiment illustrated in the drawing, it has been assumed that the normal moveout is to be removed from the seismic signals during their reproduction from recorder 22 through reproducing heads 23, but it will be obvious to those skilled in the art that the normal moveout may also be removed at any one of a number of other stages during the processing operation. For example, the normal moveout could be removed during the initial recording stage by connecting normal moveout programmer 31 to recording heads 22A, 22B, 22C, and 22D and driving these recording heads from the programmer during the initial recording operation. However, this method would have the disadvantage that the original seismic signals would not be available for inspection or examination since the normal moveout would be removed prior to the original recording. Alternatively, the normal moveout removal could be performed when the seismic signals are recorded on recorder 36. In such a case, normal moveout programmer 31 would be connected to recording heads 36A through 36H to drive these heads in accordance with the normal moveout function during the reproduction of the original traces from recorder 22. As an additional alternate, the normal moveout removal operation could be performed when the signals are being reproduced from recorder 36 through reproducing heads 38A through 38H by connecting normal moveout programmer 31 to these reproducing heads and reproducing the signals therethrough. In a similar manner, the fixed time compensations for the signals may be introduced at any desirable stage in the signal processing operation to compensate for weathering and elevation differences, step-out and other fixed time corrections.

If the intermediate storage device is adjacent recorder 22, the signals recorded on medium 24 may then be reproduced through heads 23A, 23B, 23C and 23D. Usually, however, the field recorder is remote from the intermediate storage device, and in such cases, recording medium 24 is removed from the recorder and placed on a similar device located adjacent the intermediate storage device for reproduction of the signals. In a representative operation, a plurality of tapes are recorded in the field and then taken into the laboratory or field office for analysis. In such a case, a device substantially identical to recorder 22 and having reproducing heads 23A, 23B, 23C and 23D is provided on which the tapes may be placed for reproduction of the signals recorded thereon and transfer to intermediate storage device 36. During such reproduction, the reproducing heads are driven from normal moveout programmer 31 in a predetermined fashion to vary the relative time sequence of the signals reproduced from recorder 22 and thereby compensate each of the different signals for the variable time delay component caused by normal moveout. As stated above, the normal moveout correction, as a function of the time after initiation of the explosion, varies nonlinearly from a maximum value to substantially zero for values of time corresponding to the times of arrival of deep reflections, the exact configuration of this function depending upon the detector spacings and the particular velocity function obtaining in the area under study.

The normal moveout function is different for detectors at different distances from the shot point and, therefore, it is desirable that each of the reproducing heads 23A, 23B, 23C and 23D be capable of movement independently of the other reproducing heads. Programmer 31 may be of any suitable type capable of providing the drive for the reproducing heads in accordance with the desired normal moveout function. For example, the reproducing heads may be individually driven by elements of programmer 31 or may be driven from a master output shaft whose movement is modified by appropriate cams for each of the different heads. Alternatively, programmer 31 may be a closed-loop-type servo network in which a quantity representing the actual position of the reproducing heads is compared with a quantity corresponding to the desired position of the reproducing head, and the difference between the two compared quantities is utilized to drive the reproducing heads to the desired position.

The different signals are thus reproduced through the reproducing heads with normal moveout removed. During the reproduction of the traces from recorder 22, recorder 22 is synchronized with the fixed timing marks 46 on recorder 36 to insure recording of the signals on recorder 36 in the proper positions relative to the fixed timing marks 46. These signals are then supplied through amplifying and/or filtering network 32 and signal-transfer network 33 to recording heads 36A, 36B, 36C and 36D to record the normal moveout-corrected signals on four of the channels of intermediate storage device 36. If only these four signals are to be mixed, they may be then reproduced through reproducing heads 38A, 38B, 38C and 38D. As stated above, the reproducing heads of device 36 are shiftable along the time axis of the recorded signals to compensate for the substantially constant time delays among the different signals. With the effects of normal moveout removed, and compensation made for the substantially fixed intertrace time variations such as weathering and elevation differences, the arrivals of energy reflected from a given reflecting horizon should be coincident in time in all of the reproduced signals. These reproduced signals may then be mixed in signal processing network 41 in a manner which produces maximum reinforcement of each of the reflections present, with a consequent increase in signal level relative to noise level. The output from signal processing network 41 is supplied to recorder 42 to produce a permanent record of the composite signal produced by the mixing, and this output may also be supplied to display device 43 for producing a visual display for a rapid evaluation of the effects of the mixing.

Assuming that it is desired to utilize the apparatus shown in the drawing in connection with the mixing of groups of seismic detector signals produced by more than one seismic disturbance, the operation would be as follows. For example, assume that after recording the group of seismic detector signals produced by detectors 11A, 11B, 11C and 11D in response to energy produced by source 12, as described above, the shot point and detectors are moved to the locations designated in the drawing by reference characters 12', 11A', 11B', 11C' and 11D', respectively. It will be seen from the drawing that the energy paths from source 12' to detectors 11A', 11B', 11C' and 11D' will be of substantially the same lengths as the respective paths from source 12 to detectors 11A, 11B, 11C and 11D except for the varying thickness of weathered layer 15. Thus, the signal produced by detector 11A should correspond fairly closely with the signal produced by detector 11A', and this correspondence should similarly obtain for signals from detectors 11B and 11B', detectors 11C and 11C', and detectors 11D and 11D'.

However, the noise present in corresponding signals produced by the two spreads, particularly that noise which is spatial in character, such as that produced by reflections from near-surface boulders or caverns, would not tend to correspond between the two signals, so that mixing of the corresponding signals should randomize the noise to some extent and consequently reinforce the reflections. As will be well understood, this procedure is but one of the many types of interrecord mixing which may be utilized in an attempt to randomize noise or otherwise increase the signal-to-noise ratio of the detector signals.

Assuming that the group of signals produced by detectors 11A, 11B, 11C and 11D has been recorded on recording medium 24 and transferred into intermediate storage device 36, recording medium 24 is again available for recording. In this connection, it will be noted that, for the specific embodiment shown in the drawing, no moveout correction is required in mixing corresponding signals from the two groups of signals, assuming that the detectors are equally spaced from each other and from the shot point in both spreads, since the arrival times at corresponding detectors in the two spreads for a reflection from any given interface should be the same for both spreads except for the effects of differences in weathered layer thickness or elevation of the detectors. Thus, the group of signals produced by detectors 11A, 11B, 11C and 11D could be recorded on recorder 22, reproduced therefrom and transferred through network 33 to intermediate storage device 36. However, if the different geophone spreads are not symmetrical, corrections for normal moveout would be required.

Source 12' may then be activated to produce seismic energy which is converted by detectors 11A', 11B', 11C' and 11D' into electrical signals supplied through amplifier 21 to recorder 22. At stated above, it is necessary that the second group of detector signals recorded on intermediate storage device 36 be accurately positioned relative to the first group of signals stored thereon so that all of the signals are precisely aligned in time for mixing. To control the transfer of this second group of signals from recorder 22 to device 36, the signal produced by timing grooves 46 on storage device 36 is compared in network 47 with the signal produced by device 48 in response to the speed and position of recording medium 24. Network 47 compares these two values and supplies an error or correcting signal to motor 25 to bring the speed of this motor to the desired value.

When the two recording media have the desired speed and phase relationships, network 47 supplies a pulse to signal-transfer network 33 which gates the group of signals from recorder 22 into the storage bank of intermediate storage device 36 represented by recording heads 36E, 36F, 36G and 36H. Both groups of seismic detector signals are thus accurately positioned relative to each other on the storage surface of intermediate storage device 36, and all of the signals may be reproduced by reproducing heads 38A through 38H with accurate time alignment therebetween. The different reproducing heads of device 36 may be shifted different amounts to compensate for intertrace time variations caused by differences in the thickness of the weathered layer under the different detectors, dipping reflecting beds, and/or differences in the elevations of the detectors.

The reproduced signals are supplied to signal processing network 41 where, for the particular type of interrecord mixing discussed above, the outputs from reproducing heads 38A and 38E, corresponding to the signals from detectors 11A and 11A', are connected together; reproducing heads 38B and 38F, corresponding to the signals from detectors 11B and 11B', are connected together; reproducing heads 38C and 38G, corresponding to the signals from detectors 11C and 11C', are connected together; and reproducing heads 38D and 38H, corresponding to the signals from detectors 11D and 11D', are connected together. The signals are thus mixed to produce a composite record of four traces or signals, and these composite signals are applied to recorder 42 and/or display device 43.

To utilize the apparatus of the drawing to carry out one of the novel methods of interrecord mixing in accordance with this invention, a source 12 may be utilized to create a first seismic disturbance and the group of seismic detector signals resulting therefrom are recorded on medium 24 and then transferred to intermediate storage device 36, substantially as described above. Then a second seismic disturbance of considerably less magnitude than the first is created utilizing the same relative positions of source 12 and detectors 11A, 11B, 11C and 11D. The group of seismic detector signals resulting from this disturbance of reduced intensity is recorded and transferred to intermediate storage device.

In connection with the recording of the two groups of signals resulting from these seismic disturbances of different magnitudes, it will be understood that the absolute level of the two groups of signals should be adjusted relative to each other before the subtraction occurs so as to maximize cancellation of the noise. That is, the gain of the amplifiers should be increased when recording the detector signals resulting from the disturbance of smaller magnitude so as to increase the general level of the noise in these signals to substantially the same level as the noise in the group of signals resulting from the disturbance of larger magnitude.

The two groups of detector signals are then simultaneously reproduced and supplied to signal processing network 41. During the reproduction of the groups of detector signals from intermediate storage device 36, reproducing heads 38A through 38H are shifted different amounts to compensate for the differences in arrival time due to differences in the depth of the shot in the hole for the two groups of signals. The required time compensation is approximately equal to the differences in the up-hole time for the different shot depths. Also, a difference in normal moveout for a given reflection will exist for the different shot depths, and this effect may be quite substantial for very shallow reflections when the differences in shot depth are large. Therefore, it will be understood that if the normal moveout time is substantial, it may be compensated for during the reproduction of the signals from recorder 22 to produce the required time alignment of the different traces. Owing to the nonlinear transmission characteristics of the earth with respect to the energy level of the disturbance, the signal-to-noise ratios of the detector signals resulting from the disturbance of reduced intensity are considerably lower than such ratios for the disturbance of larger magnitude. Thus, subtraction of the two groups of signals in signal processing network 41 results in a larger net decrease in the noise amplitude than in the signal amplitude, resulting in an increase in signal-to-noise ratio in the composite signal.

Although but a few embodiments of the present invention have been illustrated and described, it will be obvious to those skilled in the art that various changes and modifications may be made therein without departing from the spirit of the invention or the scope of the appended claims.

We claim:

1. Apparatus for analyzing seismic data in the form of a plurality of groups of electrical signals, each of said groups being produced by a plurality of seismic detectors actuated by movement of the earth in response to an artificially generated seismic disturbance, comprising a first rotatable, reproducible recording medium for sequentially recording each of said groups of signals, a second rotatable, reproducible recording medium having a recording capacity sufficient to simultaneously store all of said groups of signals, transfer means connected between said first and said second media for transferring each of said groups of detector signals reproduced from said first medium to said second medium, timing means on said first and said second media for producing timing signals responsive to the speeds of said first and said second media, means for comparing said timing signals to produce a control signal having a magnitude dependent upon the difference between the speeds of said media, drive means responsive to said control signal for varying the speed of said first medium to produce synchronization of said first and said second recording media, means responsive to synchronization of said media for actuating said transfer means to transfer said signals to said second recording medium, and means for selectively combining the signals reproduced from said second recording medium to produce a plurality of composite signals.

2. Apparatus for analyzing seismic data in the form of a plurality of groups of electrical signals, each of said groups being produced by a plurality of seismic detectors actuated by movement of the earth in response to an artificially generated seismic disturbance, comprising a first rotatable, reproducible recording medium for sequentially recording each of said groups of signals, means for varying the relative time sequences of the signals reproduced from said first recording medium, a second rotatable, reproducible recording medium having a recording surface capable of simultaneously storing all of said groups of signals, transfer means connected between said first and said second media for transferring each of said groups of detector signals reproduced from said first medium to said second medium, timing means on said first and said second media for producing timing signals responsive to the speeds of said first and said second media, means for comparing said timing signals to produce a control signal having a magnitude dependent upon the difference between the speeds of said media, drive means responsive to said control signal for varying the speed of said first medium to produce synchronization of said first and said second recording media, means responsive to synchronization of said media for actuating said transfer means to transfer said signals to said second recording medium, and means for selectively combining the signals reproduced from said second recording medium to produce a plurality of composite signals.

References Cited in the file of this patent

UNITED STATES PATENTS

| | | |
|---|---|---|
| 1,959,004 | Owen | May 15, 1934 |
| 2,440,971 | Palmer | May 4, 1948 |
| 2,620,890 | Lee et al. | Dec. 9, 1952 |
| 2,732,906 | Mayne | Jan. 31, 1956 |
| 2,767,389 | McCollum | Oct. 16, 1956 |

OTHER REFERENCES

Handley: "How Magnetic Recording Aids Seismic Operations," Oil and Gas Journal, January 11, 1954, vol. 52, No. 36, pages 158–159.

Palmer: "A New Approach to Seismic Exploration," World Oil Magazine, June 1954, vol. 138, No. 7, pages 140, 142, 146, 148, 151, 152, 154, 156, 158.